United States Patent
Wells et al.

(10) Patent No.: US 9,098,274 B2
(45) Date of Patent: *Aug. 4, 2015

(54) METHODS AND APPARATUSES TO IMPROVE TURBO PERFORMANCE FOR EVENTS HANDLING

(75) Inventors: Ryan D. Wells, Folsom, CA (US); Ohad Falik, Kfar Saba (IL); Jose P. Allarey, Davis, CA (US); Mary Jean Allarey, legal representative, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 12/630,438

(22) Filed: Dec. 3, 2009

(65) Prior Publication Data
US 2011/0138388 A1 Jun. 9, 2011

(51) Int. Cl.
*G06F 1/32* (2006.01)
*G06F 9/50* (2006.01)

(52) U.S. Cl.
CPC ............ *G06F 1/3203* (2013.01); *G06F 1/3287* (2013.01); *G06F 9/5027* (2013.01); *G06F 9/5094* (2013.01); *G06F 2209/501* (2013.01); *Y02B 60/1217* (2013.01); *Y02B 60/1278* (2013.01); *Y02B 60/1282* (2013.01); *Y02B 60/142* (2013.01); *Y02B 60/32* (2013.01)

(58) Field of Classification Search
None
See application file for complete search history.

(56) References Cited

U.S. PATENT DOCUMENTS

| 5,860,024 | A  | * | 1/1999  | Kyle et al. ................... 710/6 |
| 6,041,400 | A  |   | 3/2000  | Ozcelik et al. |
| 6,556,160 | B1 |   | 4/2003  | Kamel et al. |
| 6,804,632 | B2 |   | 10/2004 | Orenstien et al. |
| 6,845,456 | B1 | * | 1/2005  | Menezes et al. ............. 713/320 |
| 7,036,030 | B1 | * | 4/2006  | Altmejd ....................... 713/322 |
| 7,089,430 | B2 |   | 8/2006  | Cooper |
| 7,171,570 | B2 |   | 1/2007  | Cox et al. |
| 7,219,252 | B1 |   | 5/2007  | Li et al. |
| 7,340,622 | B2 |   | 3/2008  | Cox et al. |
| 7,584,369 | B2 |   | 9/2009  | Capps et al. |
| 7,617,403 | B2 |   | 11/2009 | Capps et al. |
| 7,698,417 | B2 |   | 4/2010  | Rizzi et al. |
| 8,219,994 | B2 | * | 7/2012  | Topaloglu .................... 718/102 |
| 8,261,112 | B2 | * | 9/2012  | Carter et al. ................. 713/320 |
| 2002/0087896 | A1 |  | 7/2002 | Cline et al. |

(Continued)

FOREIGN PATENT DOCUMENTS

| CN | 101086722 | 12/2007 |
| CN | 101558383 | 10/2009 |

(Continued)

OTHER PUBLICATIONS

Preliminary Amendment for U.S. Appl. No. 13/156,268, filed Apr. 6, 2012—11 pages.*

(Continued)

*Primary Examiner* — Tanh Nguyen
(74) *Attorney, Agent, or Firm* — Mnemoglyphics, LLC; Lawrence M. Mennemeier (57) ABSTRACT

Embodiments of an apparatus for improving performance for events handling are presented. In one embodiment, the apparatus includes a number of processing elements and task routing logic. If at least one of the processing elements is in a turbo mode, the task routing logic selects a processing element for executing a task based at least on a comparison of performance losses.

15 Claims, 4 Drawing Sheets

(56) References Cited

U.S. PATENT DOCUMENTS

| | | |
|---|---|---|
| 2002/0133729 A1 | 9/2002 | Therien et al. |
| 2002/0194509 A1 | 12/2002 | Plante et al. |
| 2003/0115242 A1 | 6/2003 | Hayduk |
| 2004/0006720 A1 | 1/2004 | Atkinson |
| 2004/0071184 A1 | 4/2004 | Naveh et al. |
| 2004/0210787 A1 | 10/2004 | Cox et al. |
| 2004/0215987 A1* | 10/2004 | Farkas et al. .................. 713/300 |
| 2005/0005182 A1 | 1/2005 | Tomita |
| 2005/0060589 A1 | 3/2005 | Athas |
| 2005/0289365 A1 | 12/2005 | Bhandarkar |
| 2006/0026447 A1 | 2/2006 | Naveh et al. |
| 2006/0031691 A1 | 2/2006 | Bacchus et al. |
| 2006/0053326 A1 | 3/2006 | Naveh et al. |
| 2006/0090161 A1* | 4/2006 | Bodas et al. .................. 718/100 |
| 2006/0146852 A1* | 7/2006 | Munagala et al. ............ 370/419 |
| 2006/0149975 A1 | 7/2006 | Rotem et al. |
| 2006/0168571 A1* | 7/2006 | Ghiasi et al. .................. 717/127 |
| 2006/0265616 A1 | 11/2006 | Cesare et al. |
| 2007/0033425 A1 | 2/2007 | Clark |
| 2007/0061603 A1 | 3/2007 | Cox et al. |
| 2007/0124609 A1 | 5/2007 | Lee |
| 2008/0005592 A1 | 1/2008 | Allarey et al. |
| 2008/0028236 A1 | 1/2008 | Capps et al. |
| 2008/0028244 A1 | 1/2008 | Capps et al. |
| 2008/0028854 A1 | 2/2008 | Evans |
| 2008/0148027 A1 | 6/2008 | Fenger et al. |
| 2009/0089602 A1 | 4/2009 | Bose et al. |
| 2009/0109230 A1* | 4/2009 | Miller et al. .................. 345/506 |
| 2009/0132844 A1 | 5/2009 | Allarey et al. |
| 2009/0138737 A1* | 5/2009 | Kim et al. ..................... 713/322 |
| 2009/0172423 A1* | 7/2009 | Song et al. .................... 713/300 |
| 2009/0217277 A1* | 8/2009 | Johnson et al. ............... 718/102 |
| 2009/0235105 A1* | 9/2009 | Branover et al. ............. 713/330 |
| 2009/0248988 A1 | 10/2009 | Berg et al. |
| 2009/0249094 A1 | 10/2009 | Marshall et al. |
| 2009/0293048 A1 | 11/2009 | Chen et al. |
| 2010/0064162 A1* | 3/2010 | Rotem et al. .................. 713/340 |
| 2010/0191936 A1* | 7/2010 | Khatri et al. ................... 712/42 |
| 2011/0138388 A1* | 6/2011 | Wells et al. .................... 718/100 |
| 2011/0238974 A1* | 9/2011 | Wells et al. .................... 713/100 |

FOREIGN PATENT DOCUMENTS

| | | |
|---|---|---|
| TW | 200805047 A | 1/2008 |
| WO | 2006014254 A1 | 2/2006 |
| WO | 2006037119 A2 | 4/2006 |
| WO | 2007021406 A2 | 2/2007 |

OTHER PUBLICATIONS

"Power and Thermal Management in the Intel Core Duo Processor," Intel Technology Journal, vol. 10 Issue 02, May 15, 2006.

"ACPI Overview,", Mobile Architecture Lab, Intel Corporation, www.ACPI.Info/Over.HTM.

"Advance Configuration and Power Interface Specification," Hewlett-Packard Corporation, Intel Corporation, Microsoft Corporation, Phoenix Technologies Ltd., Toshiba Corporation, Rev. 3, Sep. 2, 2004.

Intel Processor Vendor-Specific ACPI: Interface Specification, Sep. 2006, Revision 005.

* cited by examiner

METHODS AND APPARATUSES TO IMPROVE TURBO PERFORMANCE FOR EVENTS HANDLING

FIELD OF THE INVENTION

Embodiments of the invention relate to interrupt events handing; more particularly, embodiments of the invention relate to improving performance for events handling.

BACKGROUND OF THE INVENTION

In a multi-core processor, it may be desirable to control processing cores to use available power headroom to maximize performance. In a situation where not all the processing cores are necessary for processing a particular workload, the cores that are idle are turned off and power is channeled to other cores that are active. The active cores typically transition into a turbo mode by operating at higher frequencies.

Task and event handling algorithms in a multi-core processor are generally pseudo-random and do not consider the impact when a core operates in a turbo mode. Consequently, the overall performance of the system is affected.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Embodiments of an apparatus for improving performance for events handling are presented. In one embodiment, the apparatus includes a number of processing elements and task routing logic. If at least one of the processing elements is in a turbo mode, the task routing logic selects a processing element for executing a task based at least on a comparison of performance losses.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

In other instances, well-known components or methods, such as, for example, microprocessor architecture, virtual machine monitor, power control, clock gating, and operational details of known logic, have not been described in detail in order to avoid unnecessarily obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The method and apparatus described herein are for selecting a processing element for events handing. Specifically, selecting a processing element for events handing is primarily discussed in reference to multi-core processor computer systems. However, methods and apparatuses for selecting a processing element for events handling are not so limited, as they may be implemented on or in association with any integrated circuit device or system, such as cell phones, personal digital assistants, embedded controllers, mobile platforms, desktop platforms, and server platforms, as well as in conjunction with any type of processing element, such as a core, a hardware thread, a software thread, or a logical processor, an accelerator core, or other processing resource. In addition, selecting a processing element for events handling may take place in any hardware/software environment, such as an operating system or a hypervisor executing on hardware.

Overview

Embodiments of an apparatus for improving performance for events handling are presented. In one embodiment, the apparatus includes a number of processing elements and task routing logic. If at least one of the processing elements is in a turbo mode, the task routing logic selects a processing element for executing a task based at least on a comparison of performance losses.

Figure 1:
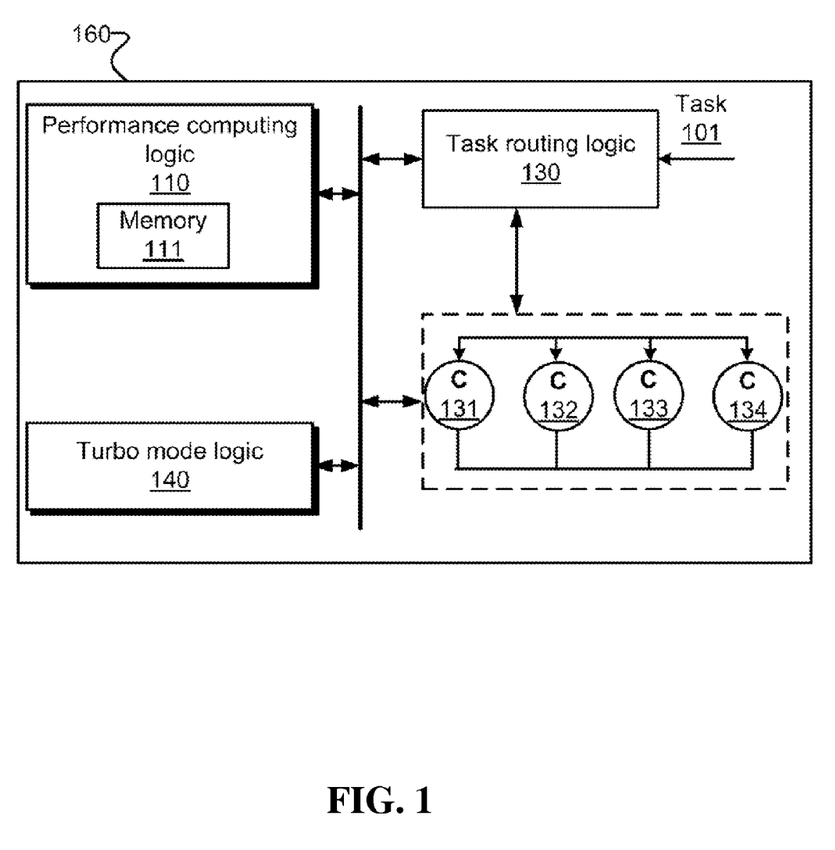
FIG. 1 shows an embodiment of a computer system including an apparatus to select a processing element to execute a task in response to an interrupt event.

FIG. 1 shows an embodiment of a computer system including an apparatus to select a processing element to execute a task in response to an event. Many related components such as buses and peripherals have not been shown to avoid obscuring the invention. Referring to FIG. 1, in one embodiment, processor 160 includes performance computing logic 110, task routing logic 130, turbo mode logic 140, and multiple processing elements, such as, processing elements 131-134. In one embodiment, performance computing logic further includes memory 111.

In one embodiment, a processing element comprises a thread, a process, a context, a logical processor, a hardware thread, a core, an accelerator core or any processing element, which shares access to other shared resources of processor 160, such as, for example, reservation units, execution units, higher level caches, memory, etc. In one embodiment, a processing element is a thread unit, i.e. an element which is capable of having instructions independently scheduled for execution by a software thread. In one embodiment, a physical processor is an integrated circuit, which includes any number of other processing elements, such as cores or hardware threads.

In one embodiment, a core is logic located on an integrated circuit capable of maintaining an independent architectural state with respect to another core. Each independently maintained architectural state is associated with at least some dedicated execution resources. In one embodiment, a hardware thread is logic located on an integrated circuit capable of maintaining an independent architectural state with respect to another hardware thread. Each independently maintained hardware thread shares access to execution resources. In some embodiments, a core and a hardware thread are used interchangeably. In one embodiment, a core or a hardware thread is also referred to as a processing element.

In one embodiment, a hardware thread, a core, or a processing element is viewed by an operating system or management software as an individual logical processor. Software programs are able to individually schedule operations on each logical processor. Additionally, in some embodiments, each core includes multiple hardware threads for executing multiple software threads.

In one embodiment, a hypervisor (not shown) provides an interface between software (e.g., virtual machines) and hardware resource (e.g., processor 160). In one embodiment, a hypervisor abstracts hardware so that multiple virtual machines run independently in parallel. In one embodiment, a virtual machine provides a software execution environment for a program, such as, for example, a task, a user-level application, guest software, an operating system, another virtual machine, a virtual machine monitor, other executable code, or any combination thereof. In one embodiment, a hypervisor allocates hardware resources (e.g., a core, a hardware thread, a processing element) to different programs.

In one embodiment, a computer system includes input/output (I/O) buffers to transmit and receive signals via interconnect. Examples of the interconnect include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

In one embodiment, a computer system, and in particular, processor 160 supports different power states (e.g., C2-state and C3-state), in accordance with Advanced Configuration and Power Interface (ACPI) specification (see, Advanced Configuration and Power Interface Specification, revision 3.0b, Oct. 10, 2006). In one embodiment, a sleep state (e.g., C2-state and C3-state) is also referred to as an idle state. In one embodiment, a processing element in an idle state is referred to as a sleeping core, an idle core, or a non-active core. In one embodiment, power gates shut off the power supply to an idle processing element. The idle processing element has to be woken up in order to begin executing a program again.

In one embodiment, turbo mode logic 140 controls processing elements 131-134 such that at least one active processing element to operate at a higher frequency if at least another processing element remains idle. Consequently, available power and thermal headroom is utilized by the active processing element to increase or improve the overall performance of the system. In one embodiment, such an operational mode is referred to herein as a turbo mode. When in a turbo mode, turbo mode logic 140 reallocates the power and thermal headroom of one or more idle processing elements to one or more active processing elements to increase the operational frequency of the one or more processing elements that are active.

In one embodiment, a factor that causes a processor to transition to and from a turbo mode (e.g., transitioning to a higher performance level or transitioning to a lower performance level) is referred to herein as an event. In one embodiment, the event is an interrupt event which is re-routable to processing elements 131-134. In one embodiment, processor 160 executes some corresponding task(s) or service(s) in response to the event. In one embodiment, interrupt events come from a device, such as, for example, a disk drive, a network card, and an input/output device.

In one embodiment, performance computing logic 110 calculates performance losses for servicing an event. In one embodiment, processor 160 uses additional time to complete a workload because of executing a task or several tasks in response to the handling of the event. In one embodiment, a performance loss is represented as a percentage. For example, if a workload takes 10 ms of original runtime to execute, a 10% performance loss would cause the workload to take 11.1 ms (i.e., 10 ms/(1−0.10)) of total runtime to complete.

In one embodiment, task routing logic 130 receives task 101 (as a result of an event) when processor 160 is in a turbo mode. In one embodiment, for example, processing element 131 is in a turbo mode while processing element 132 is in an idle mode. In one embodiment, turbo routing logic 130 selects one of the processing elements based on performance losses associated with selecting among different processing elements (whether an active processing element or a sleeping processing element) to complete task 101.

In one embodiment, a performance loss if an idle processing element is used to execute task 101 is referred to herein as Waking Performance Loss (WPL). In one embodiment, an active processing element (in a turbo mode) transitions to a lower operating frequency so that power is channeled to wake up a sleeping processing element. In one embodiment, performance computing logic determines WPL based on a decrease of an operating frequency associated with the active processing element and a frequency scalability factor of the program being executed by the active processing element. It will be appreciated by those of ordinary skill that other factors and combinations may be used to determine WPL.

In one embodiment, a frequency scalability factor is a ratio at which frequency increase (or decrease) is converted to performance increase (or decrease) for a particular workload. For example, a workload where a 10% increase in an operating frequency results in a 10% increase in performance is equivalent to a scalability factor of 1. For example, a 1% decrease in an operating frequency resulting in a 0.75% performance decrease is equivalent to a scalability factor of 0.75.

In one embodiment, memory 111 stores information about a frequency scalability factor of a program being executed by an active processing element. In one embodiment, memory 111 stores information about the decrease of an operating frequency when an active processing element transitions out from a turbo mode. In one embodiment, such information is collected by monitoring logic (not shown) and includes average history values to predict/estimate current values.

In one embodiment, a performance loss if an active processing element is used to execute task 101 is referred to herein as Active Performance Loss (APL). In one embodiment, performance computing logic 110 determines APL based on an amount of processing time for executing task 101 (in response to the event) and a utilization value associated with the program being executed by the active processing element. In one embodiment, APL is determined based on additional processing time for servicing the event on the active processing element divided by a total runtime for the program workload to complete. It will be appreciated by those of ordinary skill that other factors and combinations may be used to determine APL.

In one embodiment, memory 111 stores information about the amount of processing time to process the event. In one embodiment, such information is collected by monitoring logic (not shown) and includes average history values to predict/estimate current values. In one embodiment, the monitor logic also provides a utilization value associated with the program being executed by the active processing element.

In one embodiment, if processor 160 is in a turbo mode, task routing logic 130 determines a processing element to service an event based on a comparison of potential performance losses. In one embodiment, task routing logic 130 determines whether or not processor 160 (or any of processing elements 131-134) is in a turbo mode based on information from turbo mode logic 140.

In one embodiment, if WPL is less than APL, task routing logic 130 selects an idle processing element to service an event. Otherwise, task routing logic 130 sends the event to an active processing element (in a turbo mode).

In one embodiment, processing elements are operable under different sleep states ranging from shallow C-states with smaller exit latencies and modest power savings (e.g., ACPI C1 state) to deep C-states with longer exit latencies and higher power savings (e.g., ACPI C3). Hence, determination of performance losses including WPL and APL are different based on a C-state in which a sleeping core is. In one embodiment, it is more expensive (incurs a higher performance loss) to wake a processing element from a deep C-state than to wake a processing element in a shallow C-state.

Figure 2:
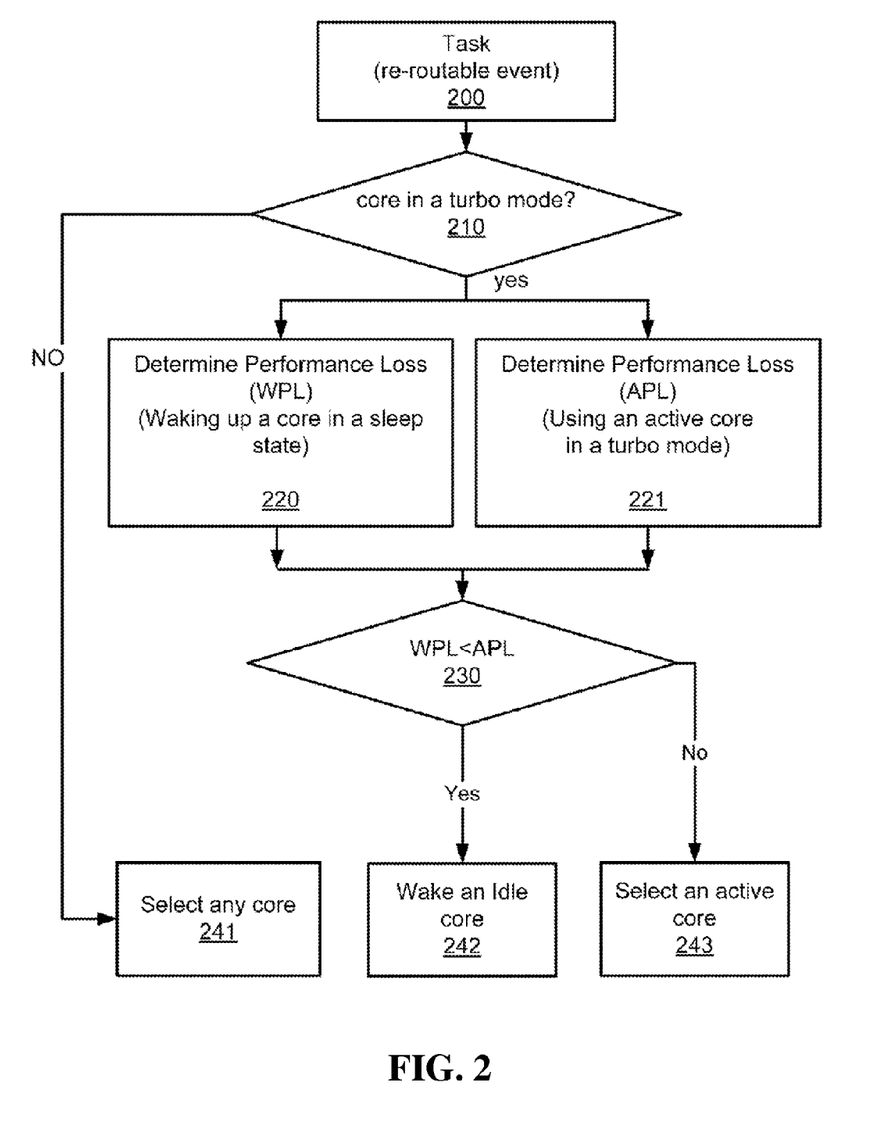
FIG. 2 is a flow diagram of one embodiment of a process to select a processing element to execute a task in response to an interrupt event.

FIG. 2 is a flow diagram of one embodiment of a process to select a processing element (of a processor) to execute a task in response to an interrupt event. The process is performed by processing logic that may comprise hardware (circuitry, dedicated logic, etc.), software (such as is run on a general purpose computer system or a dedicated machine), or a combination of both. In one embodiment, the process is performed in conjunction with a controller (e.g., task routing logic 130 with respect to FIG. 1). In one embodiment, the process is performed by a computer system with respect to FIG. 3.

Referring to FIG. 2, in one embodiment, processing logic begin by receiving a re-routable event (process block 200). Processing logic executes a task or a service in response to the event.

In one embodiment, processing logic determines whether any of processing elements (of a processor) operates in a turbo mode (process block 210). In one embodiment, processing logic selects any processing element to service the event if there is no processing element operates in a turbo mode (process block 241). In another embodiment, if there is no processing element operates in a turbo mode, processing logic selects a processing element in a power saving mode, for example, a sleeping core, to service the event.

Otherwise, in one embodiment, processing logic determines potential performance losses if any of the processing elements are in a turbo mode.

In one embodiment, processing logic determines a waking performance loss (WPL) where an idle processing element is used to execute the task (process block 220). In one embodiment, processing logic determines WPL based on a decrease of an operating frequency associated with an active processing element and a frequency scalability factor of a program being executed by the active processing element.

In one embodiment, processing logic determines an active performance loss (APL) where an active processing element is used to execute the task (process block 221). In one embodiment, processing logic determines APL based on based on an amount of processing time for executing the task and a utilization value associated with a program being executed by an active processing element.

In one embodiment, processing logic compares WPL with APL (process block 230). In one embodiment, processing logic selects an idle processing element to execute the task if WPL is less than APL (process block 242). Otherwise, processing logic selects an active processing element in a turbo mode to perform the task (process block 243).

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 3:
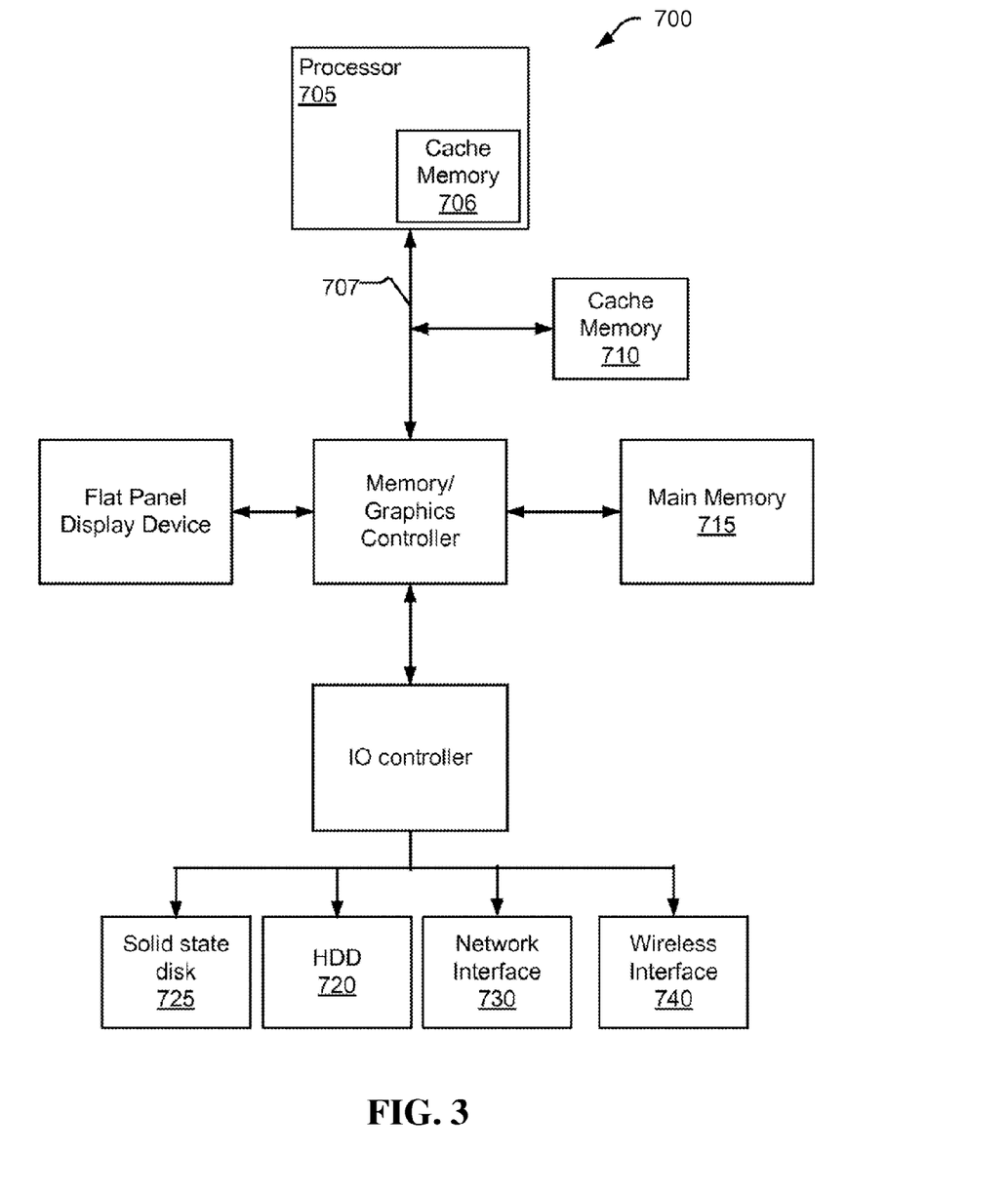
FIG. 3 illustrates a computer system for use with one embodiment of the present invention.

FIG. 3, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof. In one embodiment, processor 705 includes logic similar to components, such as, for example, task routing logic 130 with respect to FIG. 1.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 3. Furthermore, in other embodiments of the invention may be distributed throughout several circuits, logic units, or devices illustrated in FIG. 3.

Figure 4:
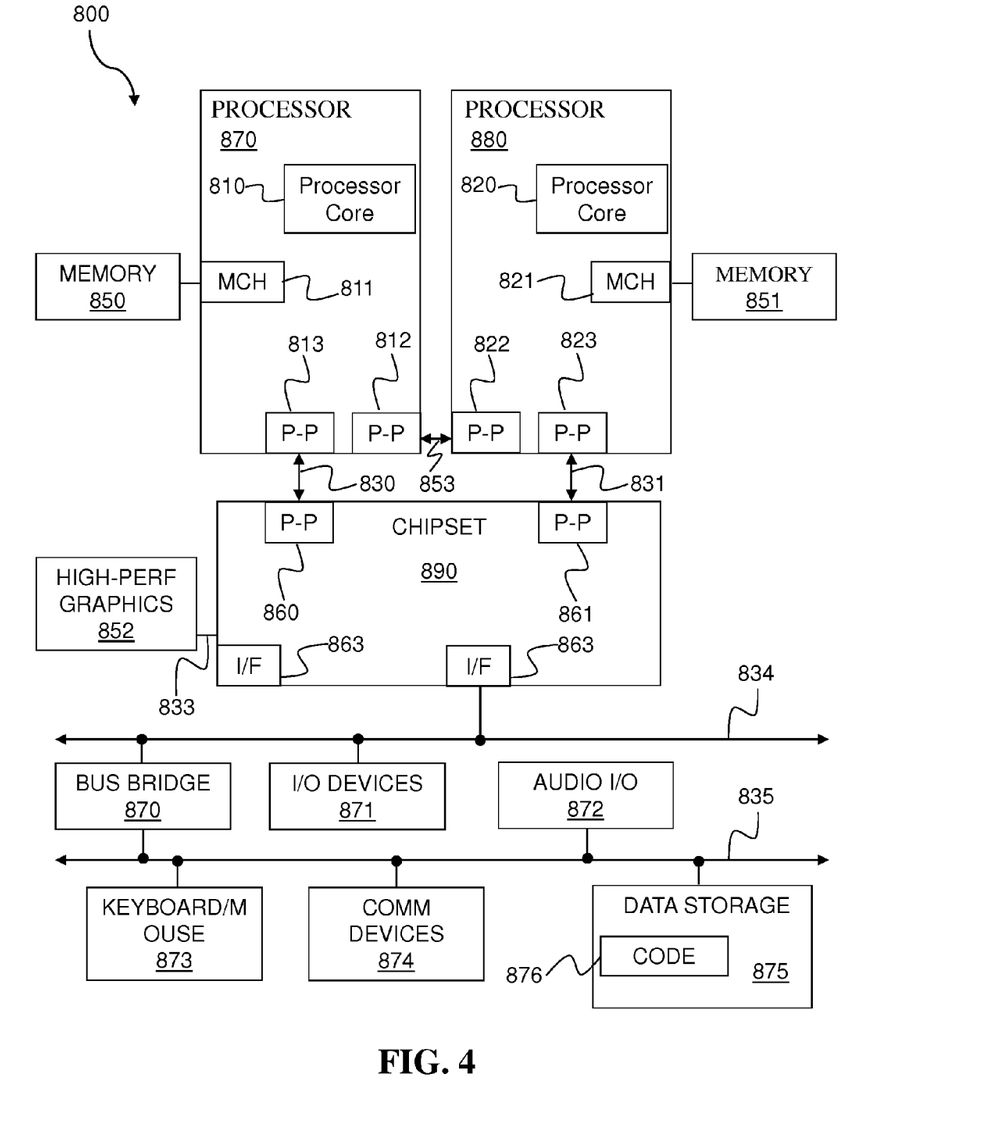
FIG. 4 illustrates a point-to-point computer system for use with one embodiment of the invention.

Similarly, at least one embodiment may be implemented within a point-to-point computer system. FIG. 4, for example, illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822.

Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 4.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
   a first processing element;
   a second processing element;
   task routing logic to select, based at least on a comparison of performance losses, between the first processing element and the second processing element for executing a task, if one of the first and second processing elements is in a turbo mode; and
   performance computing logic to determine a first performance loss based on a time period for executing the task divided by a total runtime for a workload being executed by said one of the first and second processing elements.

2. The apparatus of claim 1, further comprising memory, coupled to the task routing logic, to hold information about a frequency scalability factor of a program being executed by said one of the first and second processing elements.

3. The apparatus of claim 1, the performance computing logic to further determine a second performance loss based on a decrease of an operating frequency for said one of the first and second processing elements and a frequency scalability factor of a program being executed by said one of the first and second processing elements.

4. The apparatus of claim 1, wherein the task routing logic is operable to select between the first processing element and the second processing element, based on a smaller performance loss between the first performance loss and a second performance loss associated with selecting the first processing element and selecting the second processing element respectively.

5. The apparatus of claim 1, wherein an operating frequency of said one of the first and second processing elements will decrease if the other processing element is idle and the other processing element is selected to execute the task.

6. The apparatus of claim 1, wherein when said one of the first and second processing elements is in the turbo mode, said one of the first and second processing elements is operating at a higher frequency than that of a normal mode, and receives more power because the other processing element is idle.

7. The apparatus of claim 1, wherein the task is a re-routable event which is executable by either the first or the second processing element.

8. A system comprising:
   a plurality of processing elements including a first processing element and a second processing element;
   task routing logic to select, between the first processing element and the second processing element for executing a task, based at least on a comparison of performance losses if one of the first and second processing elements is in a turbo mode;
   performance computing logic to determine a first performance loss based on a time period for executing the task divided by a total runtime for a workload associated with a program being executed by said one of the first and second processing elements; and
   a memory, coupled to the task routing logic, to hold programs to be executed by the plurality of processing elements.

9. The system of claim 8, the performance computing logic to further determine a second performance loss of said performance losses based on a decrease of an operating frequency associated with said one of the first and second processing elements and a frequency scalability factor of a program being executed by said one of the first and second processing elements.

10. A system comprising:
    performance computing logic to determine a performance loss based on a time period for executing a task divided by a total runtime for a workload being executed by an active processing element;
    a plurality of processing elements including a first processing element and a second processing element;
    task routing logic to select between the first processing element and the second processing element for executing a task, if one of the first and second processing elements is in a turbo mode; and
    a memory, coupled to the task routing logic, to hold programs to be executed by the plurality of processing elements.

11. The system of claim 10, wherein the task routing logic is operable to select between the first processing element and the second processing element, based on a smaller performance loss between a first performance loss and a second performance loss associated with selecting the first processing element and selecting the second processing element respectively.

12. A method comprising:
    determining whether one of a plurality of processing elements operates in a turbo mode;
    selecting, based at least on a comparison of performance losses, a processing element from the plurality of processing elements to execute a task if one of the processing elements operates in the turbo mode; and
    determining a first performance loss based on a time period for executing the task divided by a total runtime for a workload being executed by said one of the processing elements.

13. The method of claim 12, further comprising determining a second performance loss based on a decrease of an operating frequency for said one of the processing elements and a frequency scalability factor of a program being executed by said one of the processing elements.

14. The method of claim 12, further comprising selecting said one of the processing elements to execute the task, at least in part because the first performance loss associated with selecting said one of the processing elements is lower than a second performance loss associated with waking a processing element in a sleep state.

15. The system of claim 10, the performance computing logic to further determine another performance loss based on a decrease of an operating frequency associated with said one of the first and second processing elements and a frequency scalability factor of a program being executed by said one of the first and second processing elements.

\* \* \* \* \*